US012791138B2

(12) United States Patent
Datskii

(10) Patent No.: US 12,791,138 B2
(45) Date of Patent: Nov. 10, 2026

(54) OIL SUCTION DEVICE AND METHOD THEREOF

(71) Applicant: Roman Datskii, Pittsburg, CA (US)

(72) Inventor: Roman Datskii, Pittsburg, CA (US)

( * ) Notice: Subject to any disclaimer, the term of this patent is extended or adjusted under 35 U.S.C. 154(b) by 0 days.

(21) Appl. No.: 18/208,838

(22) Filed: Jun. 12, 2023

(65) Prior Publication Data

US 2024/0410509 A1 Dec. 12, 2024

(51) Int. Cl.
*F16L 55/07* (2006.01)

(52) U.S. Cl.
CPC .................................... *F16L 55/07* (2013.01)

(58) Field of Classification Search
CPC ........................................................ F16L 55/07
USPC .......................................................... 141/231
See application file for complete search history.

(56) References Cited

U.S. PATENT DOCUMENTS 5,230,374 A * 7/1993 Dawson .................. B62B 1/264
141/59
5,450,924 A * 9/1995 Tseng ................... F01M 11/045
137/202
6,612,348 B1 * 9/2003 Wiley ..................... B63B 27/19
222/105

* cited by examiner

*Primary Examiner* — Jason K Niesz
(74) *Attorney, Agent, or Firm* — The Roy Gross Law Firm, LLC; Roy D. Gross

(57) ABSTRACT

The present invention relates in general to a portable fluid system, and more particularly to a portable suction device for removing oil from an oil containing device. An oil suction device includes an electric pump having a mounting plate configured to be fixedly attached by a first surface of the mounting plate to the electric pump and to be installed by a second surface of the mounting plate on a solid surface near an oil pumping point. The second surface of the mounting plate comprising a plurality of soft feet configured to provide such a force of friction with the solid surface near the oil pumping point that the electric pump does not move on the solid surface during operation. The oil suction device includes a first tube having a first removable sealed plug at a first end of the first tube and at a second end configured to be in fluid communication with an inlet of the electric pump through a first connector. The oil suction device includes a second tube having a second removable sealed plug at a first end of the second tube and a clip-on connector and at a second end configured to be in fluid communication with an outlet of the electric pump through a second connector.

9 Claims, 3 Drawing Sheets

OIL SUCTION DEVICE AND METHOD THEREOF

TECHNICAL FIELD

The present invention relates in general to a portable fluid system, and more particularly to a portable suction device for removing oil from an oil containing device.

BACKGROUND

Numerous inventions for oil suction devices have been provided in the prior art that will be described.

US8109364B2 teaches a portable, self-contained, fluid system. The portable, self-contained, fluid changing system may be used as a fluid changing device for changing a fluid such as oil or another suitable fluid in a container of a boat, recreational vehicle (RV), automobile or other suitable military, agricultural or industrial device. Alternatively, portable, self-contained, fluid system may also be used for providing fluid such as water or other suitable fluid for cleaning or showering. Moreover, the portable, self-contained, fluid system may also have a reversible electric pump that may be adapted or switched for pumping in either direction once the pump is affixed on the reservoir so the system may be sold and marketed for use in a fluid changing type of device or in a water providing or cleaning type of device consistent with that described above.

US20150260337A1 teaches an oil suction device which comprises a container and a plurality of movable fasteners. An oil supply pump and a connection pipe can be directly accommodated in a first accommodation trough and a second accommodation trough of a container respectively to be taken along with the container anytime. And because the oil is flowed from the small diameter section to the large diameter section, the outlet pressure of the oil from the large diameter section may be larger and the dust may be not accumulated in the connection pipe easily. Through the movable fastener which is disposed on the container and can be detached to two pieces, the power cord of the oil supply pump is detachably fixed by the simplified structure and operation. It is convenient for use and storage. The oil suction device has a simplified structure and the operation of the oil suction device is convenient.

The systems mentioned are versatile but bulky because the pumps are affixed on the reservoirs. In addition, the systems do not provide protection against spillage of oil drops after the suction is completed.

US6102159A teaches a portable system for removing oil from an oil containing device. The system includes a pump, fluid conduit apparatus, and power conduit apparatus. The pump pumps the oil out of the oil containing device. The fluid conduit apparatus is in fluid communication with the pump and with the oil containing device. The power conduit apparatus is in electrical communication with the pump. The system does not provide protection against spillage of oil drops after the suction is completed.

Further areas of applicability of the present disclosure will become apparent from the detailed description, the claims and the drawings. The detailed description and specific examples are intended for purposes of illustration only and are not intended to limit the scope of the disclosure.

SUMMARY OF THE INVENTION

The claimed technical solution aims solving a technical problem, constituting a creation of a convenient device that provides environmental protection from oil drops after pumping is completed.

According to a preferred embodiment of the invention an oil suction device includes an electric pump having a mounting plate configured to be fixedly attached by a first surface of the mounting plate to the electric pump and to be installed by a second surface of the mounting plate on a solid surface near an oil pumping point. The second surface of the mounting plate comprising a plurality of soft feet configured to provide such a force of friction with the solid surface near the oil pumping point that the electric pump does not move on the solid surface during operation. The oil suction device includes a first tube having a first removable sealed plug at a first end of the first tube and at a second end configured to be in fluid communication with an inlet of the electric pump through a first connector. The oil suction device includes a second tube having a second removable sealed plug at a first end of the second tube and a clip-on connector and at a second end configured to be in fluid communication with an outlet of the electric pump through a second connector. Said connectors are configured to provide connection to the electric pump of tubes of various diameters.

A method includes the following steps:

- starting and short heating the fluid container;
- connecting the second end of the first tube to the inlet of the electric pump;
- removing the first removable sealed plug from the first end of the first tube;
- connecting the first end of the first tube to the fluid container;
- connecting the second end of the second tube to the outlet of the electric pump;
- removing the second removable sealed plug from the first end of the second tube;
- using the pump case table to select the reservoir of a required volume;
- connecting the second tube to the reservoir using the clip-on connector;
- connecting the electric pump to the power conduit apparatus;
- turning on the electric pump;
- removing the fluid from the fluid container;
- turning off the electric pump;
- disconnecting the electric pump from the power conduit apparatus;
- removing the first tube from the fluid container;
- removing the second tube from the reservoir;
- connecting the first removable sealed plug to the first end of the first tube;
- connecting the second removable sealed plug to the first end of the second tube.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiments and particularly pointed out in the claims. However, such drawings and description disclose only some of the various ways in which the invention may be practiced.

BRIEF DESCRIPTION OF THE DRAWINGS

Other assemblies, systems, methods, apparatus, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Figure 1:
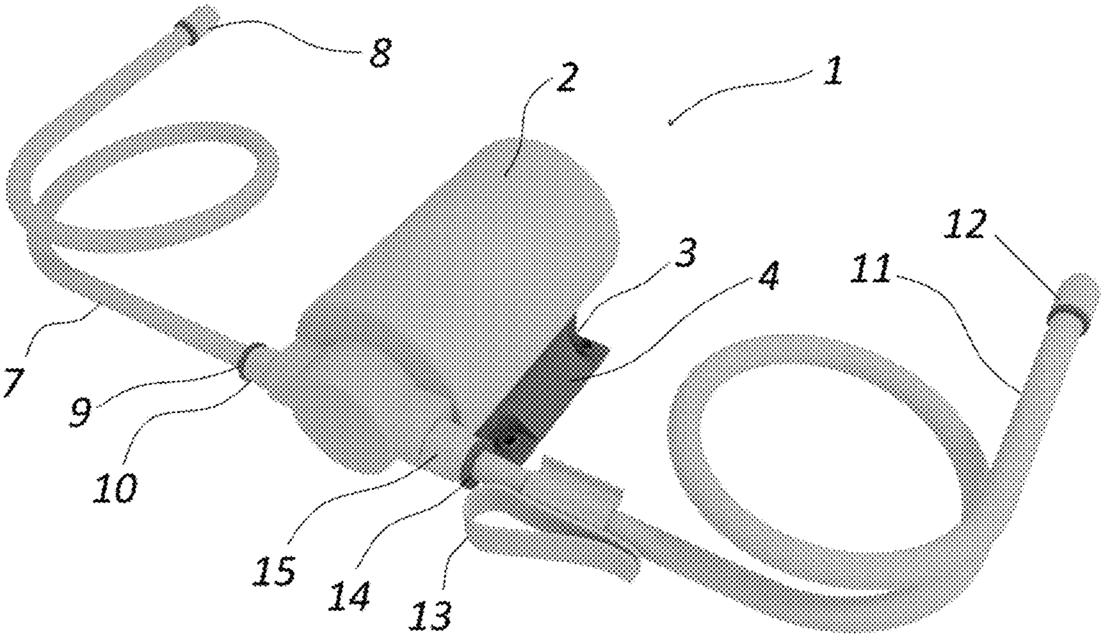
FIG. 1 is a perspective view of an oil suction device.
Figure 2:
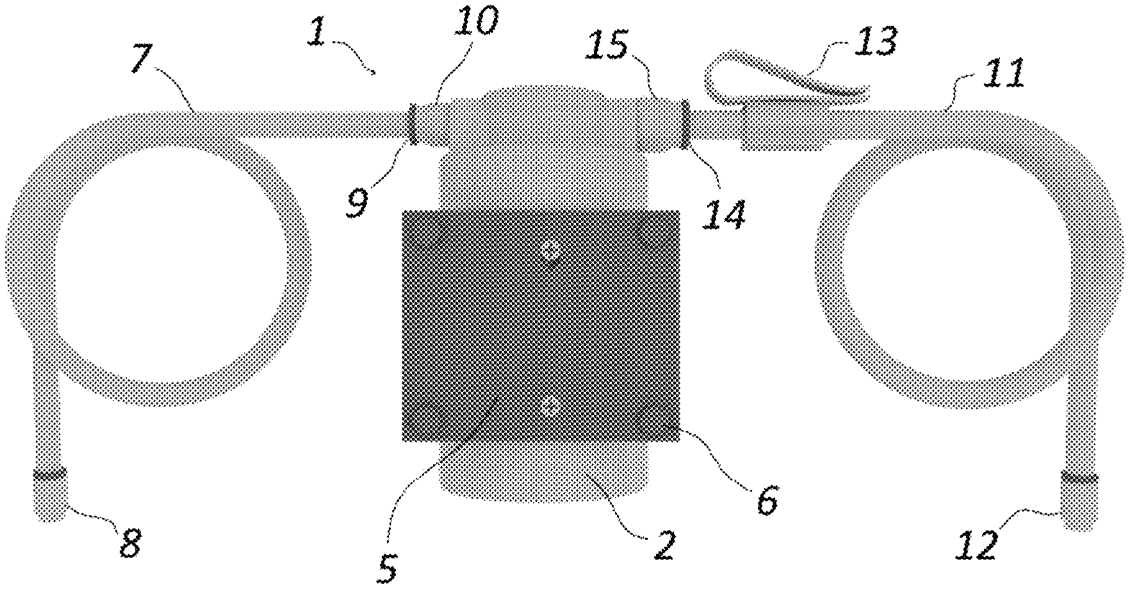
FIG. 2 is a bottom view of the oil suction device.
Figure 3:
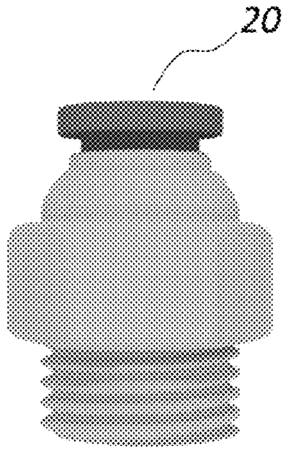
FIG. 3 is a front view of a connector of the oil suction device.
Figure 4:
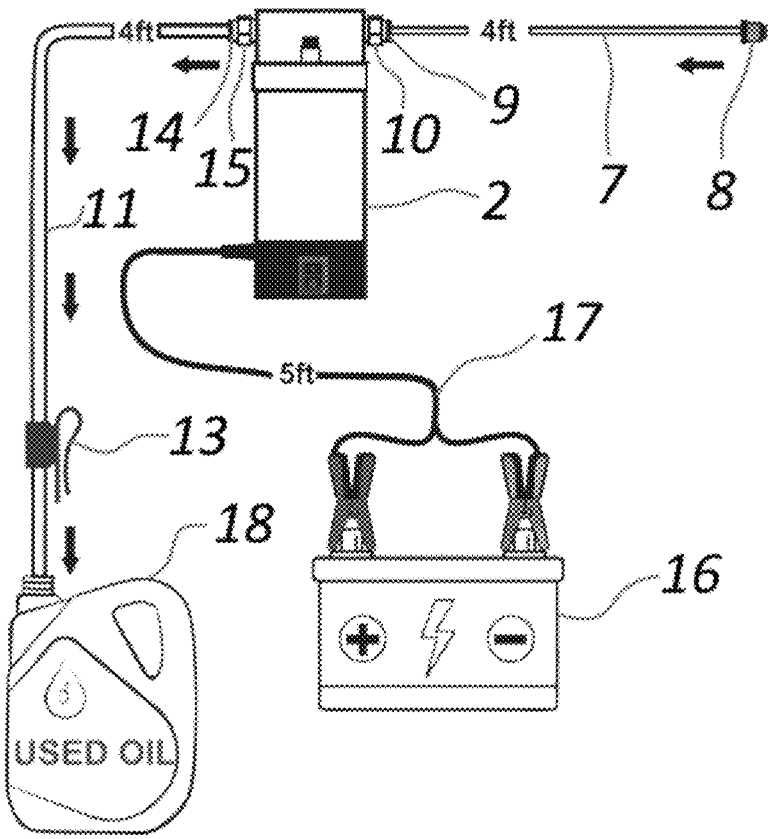
FIG. 4 is a schematic representation of the device operation.

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

According to a preferred embodiment of the invention (FIGS. 1-4) an oil suction device 1 includes an electric pump 2 having a mounting plate 3 configured to be fixedly attached by a first surface 4 of the mounting plate 3 to the electric pump 2 and to be installed by a second surface 5 of the mounting plate 3 on a solid surface near an oil pumping point. The second surface 5 of the mounting plate comprising a plurality of soft feet 6 configured to provide such a force of friction with the solid surface near the oil pumping point that the electric pump 2 does not move on the solid surface during operation.

The mounting plate 3 of the electric pump can be made of plastic or metal. The plurality of soft feet 6 can be made of rubber.

The oil suction device includes a first tube 7 having a first removable sealed plug 8 at a first end of the first tube 7 and at a second end configured to be in fluid communication with an inlet 9 of the electric pump 2 through a first connector 10. The oil suction device 1 includes a second tube 11 having a second removable sealed plug 12 at a first end of the second tube 11 and a clip-on connector 13 and at a second end configured to be in fluid communication with an outlet 14 of the electric pump 2 through a second connector 15. Said connectors are configured to provide connection to the electric pump of tubes of various diameters.

The device can additionally include a power conduit apparatus 16 in electrical communication with, and for powering, the electric pump 2 through a cable 17.

The device 1 can additionally include a reservoir 18 having an inlet for receiving and holding a fluid that is being removed from a fluid container in fluid communication with the second tube 11, wherein retention of the second tube 11 on the reservoir 18 is provided by the clip-on connector 13.

The device 1 can additionally include a pump case table containing data allowing users to select a reservoir of a required volume.

Figure 5:
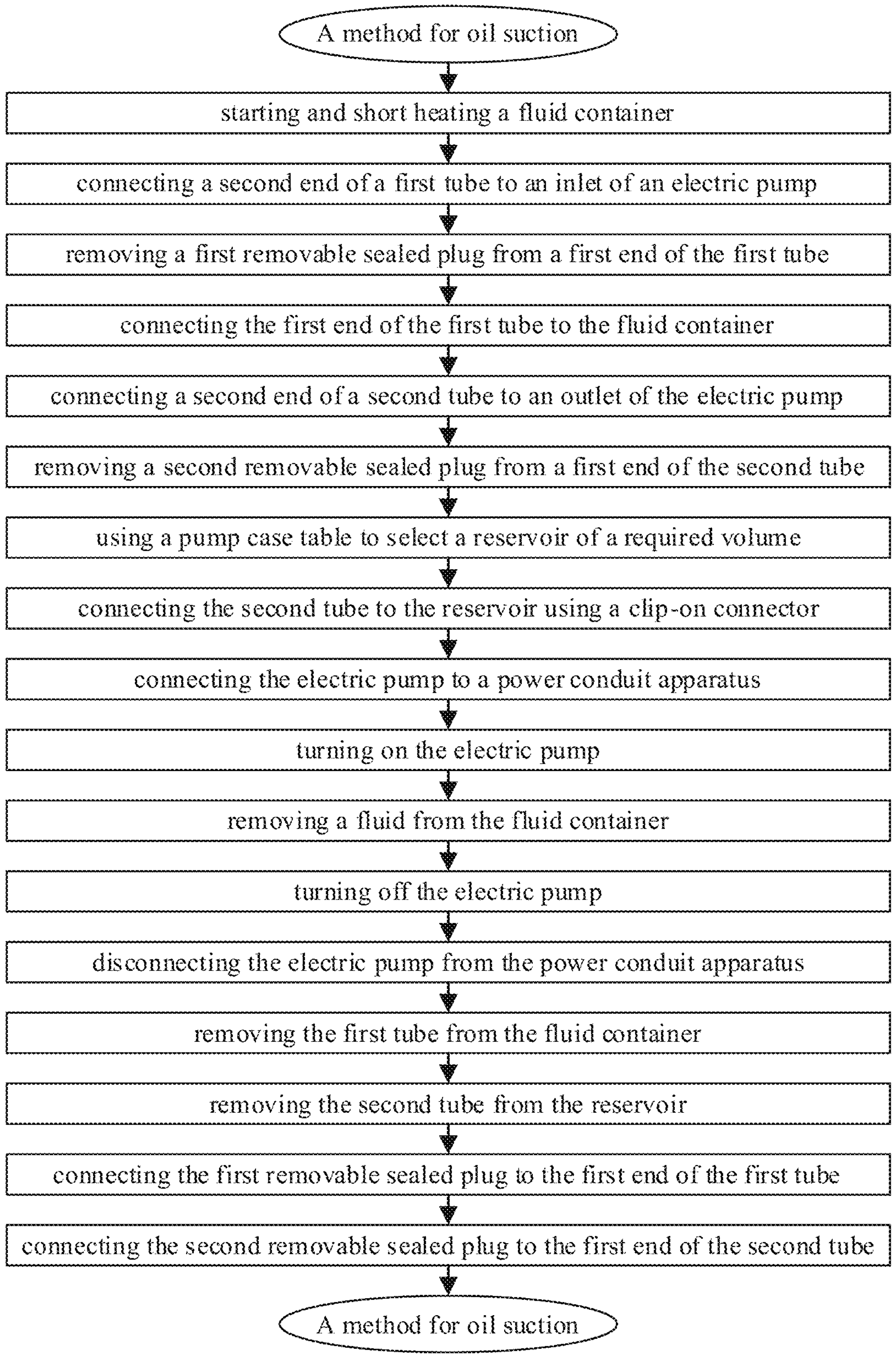
FIG. 5 is a process flow diagram of a method for oil suction in accordance with an embodiment of the present approach.

A method for oil suction includes the following steps (FIG. 5):

- starting and short heating the fluid container;
- connecting the second end of the first tube 7 to the inlet 9 of the electric pump 1;
- removing the first removable sealed plug 8 from the first end of the first tube 7;
- connecting the first end of the first tube 7 to the fluid container;
- connecting the second end of the second tube 11 to the outlet 14 of the electric pump 2;
- removing the second removable sealed plug 12 from the first end of the second tube 11;
- using the pump case table to select the reservoir 18 of a required volume;
- connecting the second tube 11 to the reservoir 18 using the clip-on connector 13;
- connecting the electric pump 2 to the power conduit apparatus 19;
- turning on the electric pump 2;
- removing the fluid from the fluid container;
- turning off the electric pump 2;
- disconnecting the electric pump 2 from the power conduit apparatus 19;
- removing the first tube 7 from the fluid container;
- removing the second tube 11 from the reservoir 18;
- connecting the first removable sealed plug 8 to the first end of the first tube 7;
- connecting the second removable sealed plug 12 to the first end of the second tube 11.

The pump case table also can be used when filling the engine with the appropriate amount of oil.

To confirm the industrial applicability of the invention, one of a plurality of possible manuals is presented below:

- start your engine and let it run until the temperature reaches 100° F.;
- turn off the engine and wait for 5 minutes to let the oil drain into the oil pan;
- take the pump out of its case and place it near the engine in the engine compartment;
- remove the oil dipstick from the dipstick tube and check the oil level to make sure the engine has enough oil;
- find a reservoir large enough to hold the used oil and place it near the engine;
- take the plug off the thick ⅜-inch diameter tube and use the included tube clamp to secure the exhaust tube to the used oil container;
- remove the plug from the 6 mm diameter thin tube and insert it into the oil dipstick hole instead of the oil dipstick to reach the bottom of the oil pan;
- take off the engine oil filler cap to avoid creating a vacuum in the engine while pumping out the used oil;
- connect the pump wires to the vehicle battery by attaching the black clamp to the negative terminal and the red clamp to the positive terminal; make sure the pump switch is in the OFF position before connecting the wires.
- turn the pump switch to the ON position to start the pump and evacuate the used oil from the engine; if the pump doesn't start, check the connections between the pump and the battery by gently moving the clamps on the battery terminals;
- pay close attention to the oil pumping process and don't leave the pump unattended at any time. it's advised to wear protective eyewear, such as safety glasses, to prevent any accidental contact with oil; keep an eye on the position of the suction tube and make sure there are no air bubbles in the tube;
- if everything is set up correctly, pumping out 5 Quarts of oil should take no more than 3 minutes;
- once all the oil has been removed, turn off the pump by switching it to the OFF position and disconnect the pump wires from the battery;

- take the tubes off the used oil container and the engine and wipe them clean with a rag; put the plugs back on the ends of the tubes to prevent spills.
- wrap the tubes and wires around the pump and put the pump back in its case.
- if necessary, replace the engine oil filter.
- fill the engine with the appropriate amount of oil using a funnel and referring to the table on the bottom of the pump case.

The present invention makes it easy for anyone to get started with confidence, even if they have no prior experience changing oil. The plugs in the kit prevent oil spillage during storage, and a special clip holds the tube in place when draining oil into a container. The pump's stable plate allows users to place it on various solid surfaces with various inclinations. The connector designs in the form of quick-release fitting 20 (FIG. 3) ensure a reliable sealed connection of tubes of different diameters.

While only certain features and embodiments of the disclosure have been illustrated and described, many modifications and changes may occur to those skilled in the art without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosed embodiments. Furthermore, in an effort to provide a concise description of the exemplary embodiments, all features of an actual implementation may not have been described. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

What is claimed is:

1. An oil suction device, comprising:

an electric pump having a mounting plate configured to be fixedly attached by a first surface of the mounting plate to the electric pump and to be installed by a second surface of the mounting plate on a solid surface near an oil pumping point, wherein the second surface of the mounting plate comprising a plurality of soft feet configured to provide such a force of friction with the solid surface near the oil pumping point that the electric pump does not move on the solid surface during operation;

a first tube having a first removable sealed plug at a first end of the first tube and at a second end configured to be in fluid communication with an inlet of the electric pump through a first connector;

a second tube having a second removable sealed plug at a first end of the second tube and a clip-on connector and at a second end configured to be in fluid communication with an outlet of the electric pump through a second connector, wherein said connectors are configured to provide connection to the electric pump of tubes of various diameters.

2. The oil suction device of claim 1, further comprising a power conduit apparatus in electrical communication with, and for powering, the electric pump through a cable.

3. The oil suction device of claim 1, further comprising a reservoir having an inlet for receiving and holding a fluid that is being removed from a fluid container, in fluid communication with the second tube;

wherein retention of the second tube on the reservoir is provided by the clip-on connector.

4. The oil suction device of claim 1, further comprising a pump case table containing data allowing users to select a reservoir of a required volume.

5. The oil suction device of claim 1, wherein the mounting plate of the electric pump is made of plastic.

6. The oil suction device of claim 1, wherein the mounting plate of the electric pump is made of metal.

7. The oil suction device of claim 1, wherein the mounting plate of the electric pump is made of metall.

8. The oil suction device of claim 1, wherein the plurality of soft feet is made of rubber.

9. A method for oil suction, comprising:

starting and short heating a fluid container;

connecting a second end of a first tube to an inlet of an electric pump;

removing a first removable sealed plug from a first end of the first tube;

connecting the first end of the first tube to the fluid container;

connecting a second end of a second tube to an outlet of the electric pump;

removing a second removable sealed plug from a first end of the second tube;

using a pump case table to select a reservoir of a required volume;

connecting the second tube to the reservoir using a clip-on connector;

connecting the electric pump to a power conduit apparatus;

turning on the electric pump;

removing a fluid from the fluid container;

turning off the electric pump;

disconnecting the electric pump from the power conduit apparatus;

removing the first tube from the fluid container;

removing the second tube from the reservoir;

connecting the first removable sealed plug to the first end of the first tube;

connecting the second removable sealed plug to the first end of the second tube.

* * * * *